United States Patent
Bemis et al.

[11] Patent Number: 5,486,327
[45] Date of Patent: Jan. 23, 1996

[54] APPARATUS AND METHOD FOR INJECTING OR EXTRUDING COLORED PLASTIC

[75] Inventors: Peter F. Bemis; Loren C. Albrecht; Steven F. Schick, all of Sheboygan, Wis.

[73] Assignee: Bemis Manufacturing Company, Sheboygan Falls, Wis.

[21] Appl. No.: 184,826

[22] Filed: Jan. 21, 1994

[51] Int. Cl.⁶ ............................. B29B 7/24; B29C 47/10
[52] U.S. Cl. .................. 264/211.21; 264/349; 366/76.6; 366/76.9; 425/378.1; 425/462
[58] Field of Search ..................................... 264/211, 349, 264/176.1, 211.23, 211.21; 425/203, 204, 205, 208, 209, 376.1, 378.1, 462; 366/76, 77

[56] References Cited

U.S. PATENT DOCUMENTS

| | | |
|---|---|---|
| 2,471,324 | 5/1949 | Henning . |
| 3,150,411 | 9/1964 | Daubenfeld . |
| 3,177,272 | 4/1965 | Plymale ........................... 264/176.1 |
| 3,609,828 | 10/1971 | Compa et al. . |
| 3,679,788 | 7/1972 | Kiyono et al. ........................... 264/211 |
| 3,891,365 | 6/1975 | Fischer . |
| 3,966,857 | 6/1976 | Charlton et al. ........................... 264/75 |
| 4,013,276 | 3/1977 | Boham et al. . |
| 4,100,245 | 7/1978 | Horikawa et al. ........................... 264/211 |
| 4,127,555 | 11/1978 | Kendall-Smith et al. ............... 264/211 |
| 4,247,501 | 1/1981 | Easley et al. ........................... 264/77 |
| 4,338,274 | 7/1982 | Hill ........................... 264/171 |
| 4,474,473 | 10/1984 | Higuchi et al. ........................... 425/209 |
| 4,528,155 | 7/1985 | Elder ........................... 264/174 |
| 4,657,499 | 4/1987 | Lewellen et al. ........................... 425/208 |
| 4,793,957 | 12/1988 | Lovegrove ........................... 264/171 |
| 4,859,068 | 8/1989 | Sironi ........................... 366/76 |
| 4,877,568 | 10/1989 | Austin ........................... 264/211.21 |
| 5,053,176 | 10/1991 | Cameron et al. ........................... 264/75 |

Primary Examiner—Mathieu D. Vargot
Attorney, Agent, or Firm—Michael, Best & Friedrich

[57] ABSTRACT

Apparatus including a barrel including a generally cylindrical inner wall defining a generally cylindrical chamber having a longitudinal axis, an inlet end for receiving solid material, and an outlet end for discharging molten material, the inner wall having therein a recess extending longitudinally of the chamber, a screw which extends along the longitudinal axis and which is rotatably housed in the chamber, a drive mechanism for rotating the screw about the axis, and a conduit for introducing colorant into the chamber, the conduit having a downstream end communicating directly with the recess so that colorant flowing through the conduit flows directly into the recess.

42 Claims, 4 Drawing Sheets

APPARATUS AND METHOD FOR INJECTING OR EXTRUDING COLORED PLASTIC

BACKGROUND OF THE INVENTION

1. Technical Field

The invention relates generally to apparatus for forming molten plastic, such as extrusion and injection molding machines, and more particularly to apparatus for adding a colored pigment to the plastic formed by such extrusion or injection molding machines. The invention also relates to apparatus including a barrel and a screw for discharging colored molten material under pressure.

2. Related Prior Art

It is generally known to add a colorant or pigment or other additive to a supply of plastic beads or pellets to be formed through either extrusion or injection molding, both of which entail the liquification of the supply of solid beads into a flow of molten plastic. The liquification of the plastic is accomplished by heating the plastic as a screw moves the plastic along a cylindrical barrel of either an extrusion machine or an injection molding machine. The plastic beads are melted by the high pressure, and resultant frictional forces, created between the plastic, the screw and the walls of the barrel, and by heating elements in the walls of the barrel.

One known method of coloring such a supply of plastic beads is to supplement the supply with a quantity of pigment concentrate. For example, it is generally known to meter liquid pigment into a hopper containing a supply of plastic beads to be introduced to the barrel of an extrusion or injection molding machine. In such an arrangement, the pigment concentrate and the beads are mixed within the confines of the hopper. One of the problems associated with this method of coloring a supply of plastic is that it entails the mixing of solid objects, namely the individual solid beads, with a liquid. Due to the generally spherical shape and unabsorbent nature of the beads, the liquid pigment is not uniformly distributed about the individual beads and is easily wiped off a bead as the bead passes into the barrel.

The amount of pigment that can be introduced to a supply of beads is limited by the interaction of the beads with the screw in the barrel of the forming apparatus. In particular, if an excessive amount of pigment is mixed with the plastic beads in the hopper, the pigment can act as a lubricant between the screw and the beads. By eliminating friction between the face of the screw and the beads, the lubricating effect of the pigment can cause the screw to merely churn the plastic beads rather than advance the beads along the barrel.

Also, the introduction of colored pigment to a hopper prior to the introduction of the plastic into the barrel creates a supply of "contaminated" plastic which, if a different colored plastic is desired, must be purged from the plastic forming apparatus. To purge the contaminated plastic requires the entire hopper of plastic to be either removed from the apparatus or cycled through the apparatus.

Another method of introducing colored pigment to a supply of plastic beads entails the addition of beads of pigment concentrate to the plastic beads. The beads of concentrate are introduced to the plastic beads in a hopper, and the mixed beads then flow into the barrel of the forming apparatus. When the pressure inside the barrel becomes sufficiently intense, the beads of concentrate burst, thereby further mixing with the plastic beads. Such a method of using pigment concentrate in the form of a beads requires the mixing of the beads of plastic and concentrate in a hopper prior to their introduction to the barrel, and the purging of the plastic in the hopper and the barrel to remove contaminated plastic from the forming apparatus. Also, the metering of concentrate in the form of beads is somewhat less precise than that of liquid concentrate.

Another method for introducing colorant to a supply of plastic is to supply liquid plastic concentrate directly to the barrel of the forming apparatus. For such a method to be successful using prior art plastic forming apparatus, the introduction of pigment to the barrel requires high pressure pumps to introduce the pigment to the barrel at a point where the plastic contained by the barrel has begun to melt. High pressure pumps are required in known arrangements because the region of the barrel into which the pigment is injected contains a supply of molten plastic under high pressure, and high pressure pumps are necessary to overcome the high pressure of the molten plastic. The introduction of pigment into the barrel at a point of lower pressure has heretofore been unsuccessful because of the above-described lubricating effect of liquid pigment on the supply of plastic beads. One advantage of introducing liquid pigment to the barrel of a plastic forming apparatus is the superior mixing of the pigment concentrate with the plastic supply. This superior mixing is realized due to the liquid/liquid nature of the two media, rather than the liquid/solid nature of the concentrate and beads. Also, the introduction of the pigment to the plastic supply at a relatively downstream point in the barrel minimizes the amount of contaminated plastic which must be purged in order to change the color of the resultant plastic. However, the expense of high pressure pumps and the controls required to practice this method of introducing colorant to a plastic supply counterbalances these advantages.

SUMMARY OF THE INVENTION

The invention provides an improved arrangement for introducing a liquid additive to the barrel of a screw-type mechanism for converting solid material to molten material. The invention also provides an improved apparatus for pumping colored molten material. More particularly, the invention provides an improved apparatus for injecting or extruding colored plastic. Compared to known apparatus of this type, the apparatus of the invention is less expensive to operate, can be changed from one color to another in less time, and wastes less plastic during color changes.

Specifically, the invention provides an apparatus comprising a heated barrel including a cylindrical inner wall defining a cylindrical chamber. The chamber has an inlet end, an outlet end, and a longitudinal axis, which preferably extends horizontally. The apparatus also comprises a screw which is rotatably housed in the chamber and which extends along the chamber axis. If the apparatus is an extruder, the screw merely rotates. If the apparatus is part of an injection molding machine, the screw also reciprocates in known manner. The inlet end of the chamber has an inlet for introducing solid material, preferably in the form of plastic pellets, into the chamber. As is known, the screw causes the pellets to move toward the outlet end of the chamber. The chamber has a feed section adjacent the inlet end in which the pellets remain substantially solid and at a relatively low pressure, and a transition section downstream of the feed section in which the pressure on the pellets increases and the pellets begin to melt. Molten plastic flows out of the outlet end either through an extrusion die or into an injection mold. The apparatus as thus far described is conventional.

The invention provides an improved way of adding a colorant or pigment to the plastic in the barrel. The colorant, preferably a liquid, is introduced to the chamber via a groove or recess in the inner wall of the barrel. The recess is described in detail below. Colorant is supplied to the recess via a colorant feed conduit having a downstream end communicating with the recess and having an upstream and communicating with the outlet of a low-pressure pump such as a peristaltic pump. The use of a low-pressure pump reduces the cost of the apparatus and the cost of operating the apparatus.

Most of the recess, including the upstream portion thereof, extends along the bottom of the chamber and along the vertical plane including the chamber axis. The recess is defined by a bottom wall spaced from the inner wall and by spaced side walls extending between the bottom wall and the inner wall. The overall length of the recess is preferably approximately twenty percent of the overall length of the chamber. Near its downstream end, the recess turns in the direction of rotation of the screw and extends both circumferentially of the chamber and longitudinally of the chamber. This downstream portion of the recess is substantially shorter than the straight remainder of the recess, is located in the transition section of the chamber, and is "tapered", i.e., has a depth which decreases in the downstream direction. The upstream portion of the recess has a depth which increases in the downstream direction. The upstream portion of the recess is located below the pellet inlet and in the feed section of the chamber. The bottom wall has therein a bore or opening, and the colorant feed conduit communicates with the opening. The bore is preferably located approximately in the middle (lengthwise) of the recess, in the feed section of the chamber. The bore is located upstream of the transition section so that high pressure is not required to inject colorant into the recess. The bore is preferably located slightly downstream of the chamber inlet so that pellets moving past the bore are moving primarily forward or downstream. The diameter of the bore is preferably less than the average thickness of the pellets so that pellets cannot enter and plug the opening.

Over most of the length of the recess, i.e., between the upstream and downstream portions of the recess, the recess has a depth greater that the average thickness of the plastic pellets. In other words, the side walls have a height greater than the average thickness of the pellets. As a result, pellets are generally unable to "climb out of" the recess and into the chamber. Pellets in the recess therefore generally stay in the recess and move toward the downstream end thereof under the influence of the screw and the forces of pellets outside of the recess. Because pellets tend to stay in the recess, and because the recess is at the bottom of the chamber, colorant in the recess also tends to stay in the recess and move with the pellets in the recess until the pellets leave the downstream end of the recess. Thus, the colorant generally does not flow into the chamber until the colorant reaches the transition section of the chamber. This is beneficial in that the colorant does not lubricate pellets in the feed section of the chamber. Such lubrication of the pellets can reduce friction between the pellets and the screw and hinder movement of the pellets through the chamber.

When the apparatus is being changed from one color to another, it is necessary to clean out only the portion of the chamber downstream of the recess (where the colorant actually enters the chamber). The feed section of the chamber is not "contaminated" by the colorant. Consequently, less plastic is wasted when changing colors and less time is required to change colors.

Compared to known methods of introducing colorant, this method has been found to require significantly less colorant to color a given amount of plastic. This reduces the cost of operating the apparatus and also simplifies cleaning of the apparatus and changing the apparatus from one color to another.

Other features and advantages of the invention will become apparent to those skilled in the art upon review of the following detailed description, claims and drawings.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An extrusion apparatus 10 embodying the invention is illustrated in FIGS. 1 through 5. While the illustrated apparatus is an extrusion apparatus, it should be understood that the invention is applicable to other types of apparatus for discharging or pumping colored molten material.

The apparatus 10 comprises (see FIG. 1) an elongated barrel 14 having a cylindrical inner wall or surface 18 defining a cylindrical chamber 22. The chamber 22 has a horizontal longitudinal axis 26, a left or inlet end 30, and a right or outlet end 34. The chamber 22 preferably has a length of approximately fifty-eight inches and a diameter of approximately two and one-half inches. The length-to-diameter ratio is preferably between 16:1 and 36:1. The right end of the barrel 14 defines an outlet 46 communicating with the outlet end 34 of the chamber 22. An extrusion die (not shown) is mounted on the right end of the barrel 14 in communication with the outlet 46 as is known in the art. A hopper 50 defines an inlet 54 communicating with the inlet end 30 of the chamber 22. The hopper 50 contains conventional plastic pellets 58. The pellets 58 are preferably made of polypropylene or rigid PVC and can be round or rectangular or have a different shape. The pellets 58 preferably have an average thickness or diameter of approximately 0.125 inch, although pellets of different sizes can be used.

Figure 4:
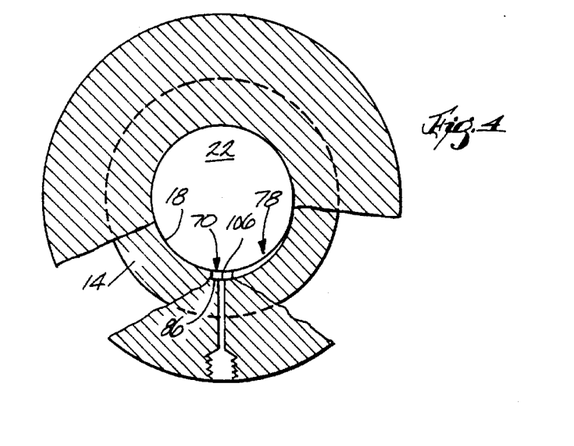
FIG. 4 is a view taken along line 4—4 in FIG. 2 and along line 4—4 in FIG. 3.
Figure 5:
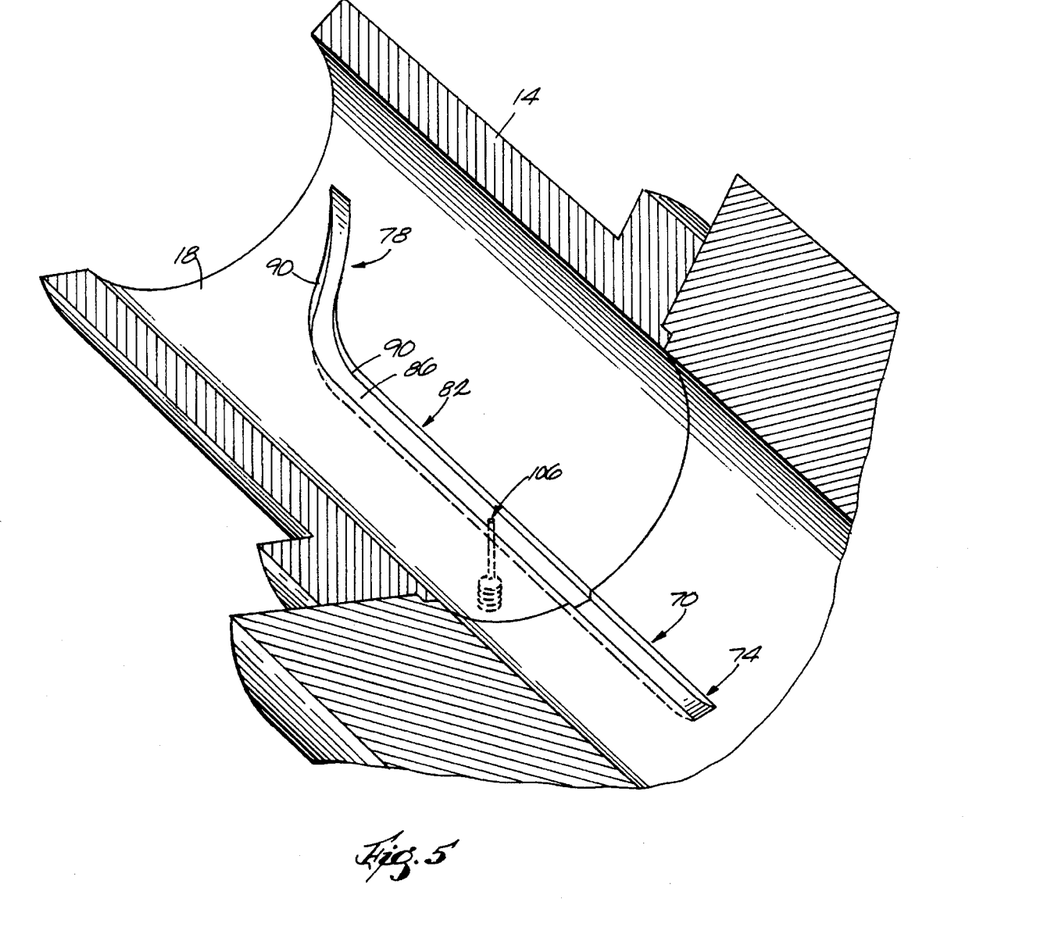
FIG. 5 is a sectional perspective view of the portion of the apparatus shown in FIG. 3.

The apparatus 10 also comprises a screw 62 which extends along the axis 26 and which is rotatably housed in the chamber 22. A drive mechanism 66 is connected to the left end of the screw 62 for rotating the screw 62 about the axis 26. The screw 62 rotates counterclockwise as seen in FIG. 4. As is known in the art, the screw 62 moves pellets 58 through the chamber 22 and the barrel 14 is heated so that pellets melt as they move through the chamber 22. The chamber 22 has (see FIG. 1) a feed section which, referring to FIG. 1, extends to the right of the inlet end 30 of the chamber 22 and in which the pellets 58 remain substantially solid and at a relatively low pressure. The chamber 22 also has a transition section which extends downstream from or to the right from the feed section and in which the pressure on the pellets 58 increases and the pellets begin to melt. The chamber 22 also has a metering section which extends downstream from or to the right from the transition section. The apparatus 10 as thus far described is conventional and will not be described in greater detail.

Figure 3:
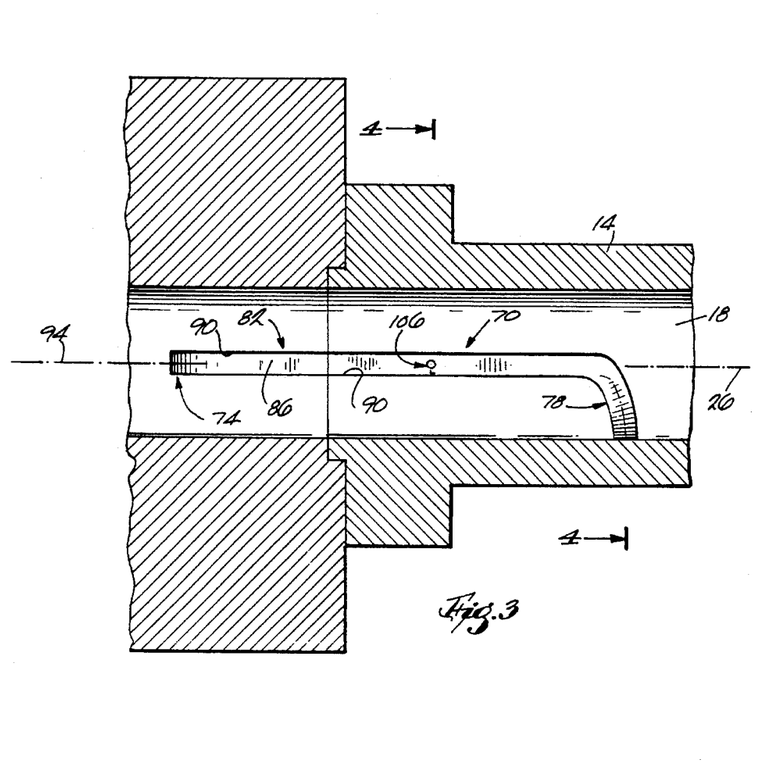
FIG. 3 is a view taken along line 3—3 in FIG. 2.

The apparatus 10 also comprises means for adding a liquid additive, such as liquid pigment or colorant, to the chamber 22. Any conventional liquid colorant can be employed. A suitable colorant is manufactured by the Liquid Coatings Division of Ferro Corporation of Cleveland, Ohio. It is believed any liquid additive can be added to the chamber 22. The means for adding colorant includes a recess or groove 70 in the inner wall 18 of the barrel 14. The depth of the recess 70 is exaggerated in FIG. 1 for clarity. The recess 70 includes (see FIGS. 2 and 3) an upstream portion 74, a downstream portion 78, and a main portion 82 between the upstream and downstream portions. The recess 70 is defined by (see FIGS. 2, 3 and 5) a bottom wall 86 spaced from the inner wall 18 and by spaced side walls 90 extending between the bottom wall 86 and inner wall 18. In the illustrated construction, the bottom wall 86 extends horizontally and is planar in the main portion 82. The side walls 90 extend generally vertically. As shown in FIG. 3, the upstream portion 74 of the recess 70 is located beneath the inlet 54 and in the feed section of the chamber 22. The downstream portion 78 of the recess 70 is located in the transition section of the chamber 22. As shown in FIG. 4, the upstream and main portions of the recess 70 are substantially straight or linear and extend along the bottom of the chamber 22 and along a vertical plane 94 including the axis 26. In other words, the upstream and main portions of the recess 70 extend longitudinally of the chamber 22. The downstream portion 78 of the recess 70 extends both longitudinally and circumferentially of the chamber 22, in the direction of screw rotation. The upstream portion 74 has a depth (the height of the side walls 90) which increases in the downstream direction (to the right in FIG. 2), and the downstream portion 78 has a depth which decreases in the downstream direction. The main portion 82 has a substantially constant depth along the length thereof. The height of the side walls 90, i.e., the depth of the recess 70, in the main portion 82 is approximately 0.150 inch. The depth of the recess is preferably between 100 and 125% of the diameter of a pellet. The width of the bottom wall 86 (from right to left in FIG. 4), i.e., the width of the recess 70, is approximately 0.375 inch. The width of the recess is preferably between two and four times the diameter of a pellet. The length of the recess 70 (from right to left in FIG. 2) is approximately 8.75 inches, or approximately 3.5 chamber diameters. The recess length is preferably between three and five times the chamber diameter.

Figure 1:
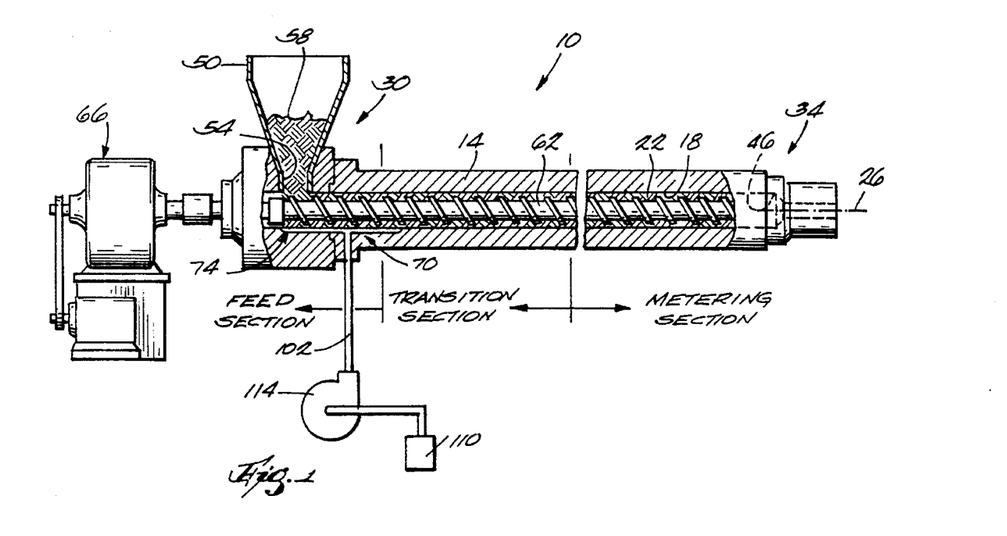
FIG. 1 is a partially schematic elevational view, partially broken away, of an extrusion apparatus embodying the invention.
Figure 2:
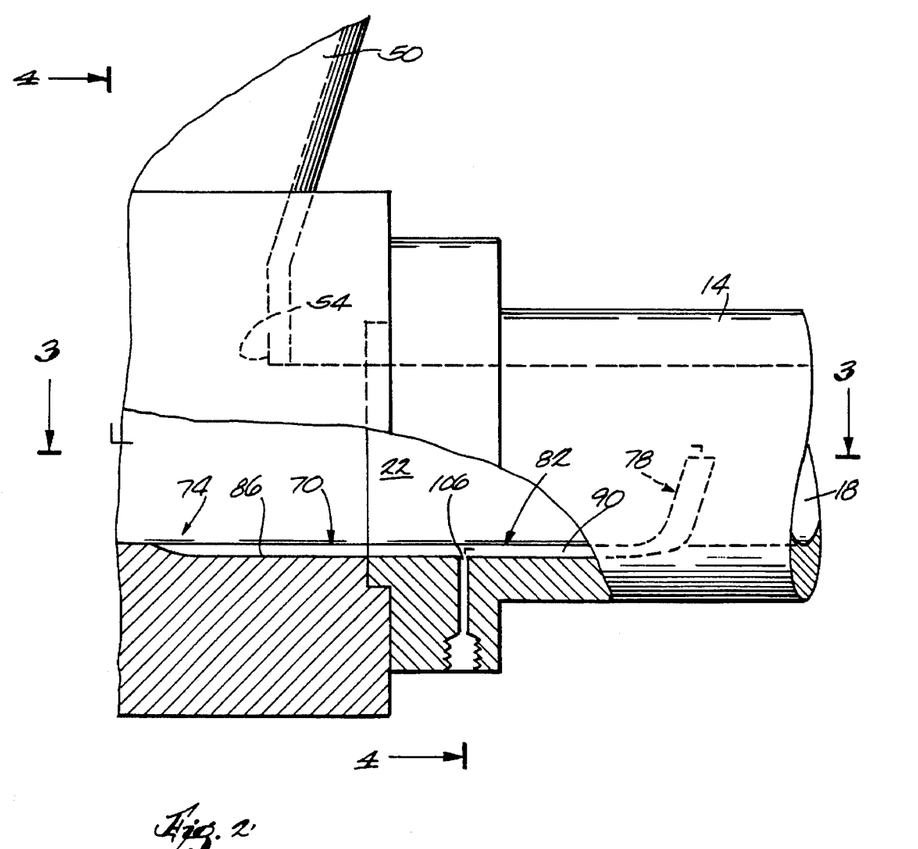
FIG. 2 is an enlarged elevational view, partially broken away, of a portion of the apparatus shown in FIG. 1.

The means for adding colorant to the chamber 22 also includes (see FIG. 1) a conduit 102 having upstream and downstream ends (lower and upper ends as seen in FIG. 1). The downstream end of the conduit 102 communicates with the recess 70 through a bore or opening 106 (see FIGS. 2–5) in the bottom wall 86 of the recess 70. The size of the bore 106 is exaggerated in FIG. 1 for clarity. The opening 106 has a diameter of approximately 0.093 inch. The opening preferably has a diameter of between 0.050 and 0.125 inch. The opening 106 is located in the feed section of the chamber 22, preferably approximately equidistant from the upstream and downstream ends of the recess 70. The opening 106 is preferably located slightly downstream of the inlet 54 so that at least one flight of the screw 62 is upstream of the opening 106.

The means for adding colorant also includes (see FIG. 1) a source 110 of colorant, and a low-pressure pump 114 having an inlet communicating with the colorant source 110 and outlet communicating with the upstream end of the conduit 102. The pump 114 is preferably a conventional peristaltic pump. A pump having a maximum pressure of 170 psi and an operating pressure of 45 psi can be employed. The optimal flow rate of colorant through the conduit 102 must be determined on a case-by-case basis and depends on many factors (such as the flow rate of plastic through the chamber 22) that are apparent to those skilled in the art.

In operation, pellets 58 from the hopper 50 are carried by the screw 62 from the inlet end 30 of the chamber 22 to the outlet end 34 of the chamber 22. The pellets 58 remain substantially solid and are subjected to relatively low pressures in the feed section. In the transition section, the pressure on the pellets 58 increases and the pellets begin to melt. The pellets 58 are completely melted so that molten plastic is discharged through the outlet 46. Some pellets 58 fall into the recess 70 and move along the recess 70 (toward the outlet 46) under the influence of the screw 62 and the forces of pellets outside of the recess 70. Because the side walls 90 of the recess 70 have a height greater than the average thickness of the pellets 58, pellets in the recess 70 tend to stay in the recess 70 and are unable to "climb out of" the recess 70 until reaching the downstream end of the recess 70, at which point the decreasing depth of the recess 70 forces the pellets 58 to move out of the recess 70 and into the chamber 22.

The pump 114 injects colorant into the recess 70 via the conduit 102. Because the bore is in the feed section (low-pressure section) of the chamber 22, the pump 114 does not need to generate high pressure. Because pellets 58 stay in the recess 70, and because the recess 70 is at the bottom of the chamber 22, colorant injected into the recess 70 also stays substantially within the recess 70 and moves with the pellets 58 in the recess 70. At the downstream end of the recess 70, i.e., in the transition section (high-pressure section) of the chamber 22, the colorant flows out of the recess 70 with the pellets 58. The colorant and the colored pellets 58 stay in a relatively well-defined stream for a slight distance beyond the downstream end of the recess 70, after which the colorant becomes generally evenly dispersed throughout the molten plastic in the chamber 22. The molten plastic discharged at the outlet 46 is substantially evenly colored.

While the illustrated recess 70 has linear upstream and main portions, it is believed the recess 70 could also be helical or have other configurations, as long as a substantial portion of the recess extends longitudinally of the chamber 22, i.e., extends in the direction of the axis 26 (from left to right in FIG. 1) in addition to extending circumferentially of the chamber 22. A helical configuration would still allow pellets to travel along the recess to the transition section of the chamber 22.

Figure 6:
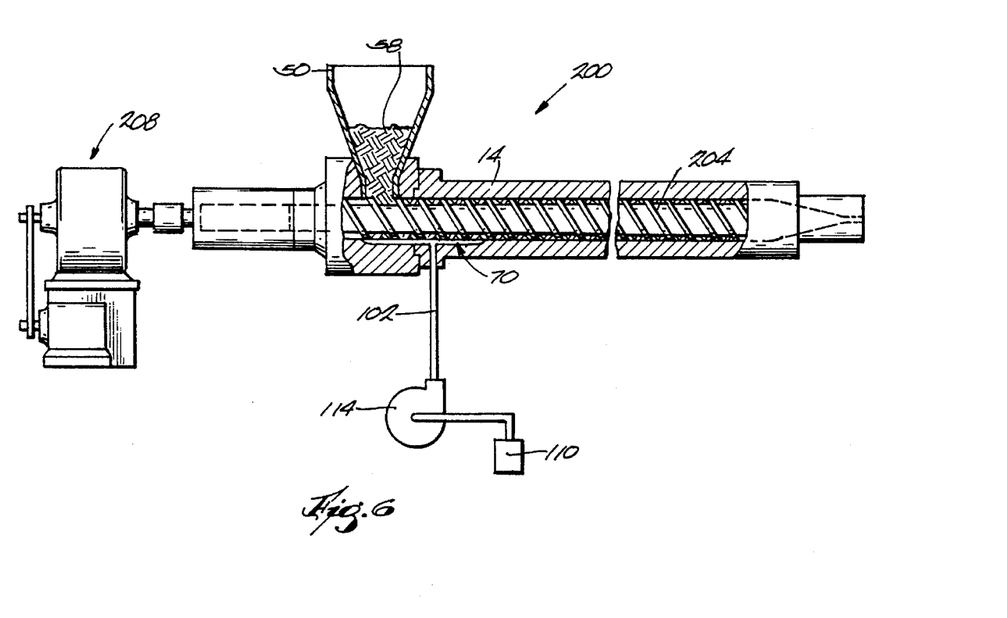
FIG. 6 is a view similar to FIG. 1 showing an injection molding apparatus that is an alternative embodiment of the invention.

An injection molding apparatus 200 that is an alternative embodiment of the invention is illustrated in FIG. 6. Except as described below, the injection molding apparatus 200 is substantially identical to the extrusion apparatus 10, and common elements have been given the same reference numerals.

The apparatus 200 comprises a screw 204 having a root diameter that increases in the downstream direction (from left to right in FIG. 6). The apparatus 200 also comprises a drive mechanism 208 that causes both rotation of the screw 204 about the axis 26 and reciprocation of the screw 204 along the axis 26. Such a screw and drive mechanism are known in the art and will not be described in greater detail. A mold (not shown) communicates with the outlet end 34 of the chamber 22, and the apparatus 200 injects molten plastic into the mold in a known manner.

Various features of the invention are set forth in the following claims.

We claim:

1. Apparatus comprising
a barrel including a generally cylindrical inner wall defining a generally cylindrical chamber having a longitudinal axis, an inlet end for receiving solid material, and an outlet end for discharging molten material, said inner wall having therein a recess extending longitudinally of said chamber,
a screw which extends along said longitudinal axis and which is rotatably housed in said chamber,
a drive mechanism for rotating said screw about said axis, and
a conduit for introducing a liquid additive into said chamber, said conduit having a downstream end communicating directly with said recess so that additive flowing from said conduit flows directly into said recess prior to flowing from said recess into said chamber.

2. Apparatus as set forth in claim 1 wherein said recess extends in substantial part generally parallel to said axis.

3. Apparatus as set forth in claim 1 wherein said axis extends horizontally, wherein said chamber has a top and a bottom, and wherein said recess extends in substantial part along said bottom of said chamber and along a vertical plane including said axis.

4. Apparatus as set forth in claim 1 wherein said screw has a direction of rotation, and wherein said recess has a downstream portion extending circumferentially of said chamber in said direction of rotation.

5. Apparatus as set forth in claim 4 wherein said downstream portion also extends longitudinally of said chamber.

6. Apparatus as set forth in claim 1 wherein said recess has upstream and downstream ends, and wherein said conduit communicates directly with said recess at a point intermediate said upstream and downstream ends of said recess.

7. Apparatus as set forth in claim 1 wherein said conduit has an upstream end, and wherein said apparatus further comprises a low-pressure pump having an outlet communicating with said upstream end of said conduit.

8. Apparatus as set forth in claim 1 wherein said recess has an upstream portion, and wherein said apparatus further comprises an inlet communicating with said inlet end of said chamber for introducing solid material into said chamber, said inlet being located above said upstream portion of said recess.

9. Apparatus as set forth in claim 1 wherein said chamber includes a feed section which extends from said inlet end of chamber and in which solid material introduced into said inlet end of said chamber remains substantially solid and at a relatively low pressure, and a transition section which extends downstream from said feed section and in which the pressure on the material in said chamber increases and the material begins to melt, and wherein said recess has an upstream portion in said feed section and a downstream portion in said transition section.

10. Apparatus as set forth in claim 1 wherein said recess has a downstream portion having a depth which decreases in the downstream direction.

11. Apparatus as set forth in claim 10 wherein said recess has an upstream portion having a depth which increases in the downstream direction.

12. Apparatus as set forth in claim 1 and further comprising an inlet for introducing pellets of material into said inlet end of said chamber, the pellets having an average thickness, and wherein said recess has, along a substantial portion thereof, a depth greater than the average thickness of the pellets.

13. Apparatus as set forth in claim 1 and further comprising an inlet for introducing pellets of material into said inlet end of said chamber, the pellets having an average thickness, and wherein said conduit communicates with said recess through a bore in said barrel, said bore having a diameter less than the average thickness of the pellets.

14. Apparatus as set forth in claim 1 wherein said recess has a recess length in the direction of said axis, and wherein chamber has a chamber length in the direction of said axis, said chamber length being approximately five times said recess length.

15. Apparatus as set forth in claim 1 wherein said recess is defined by a bottom wall spaced from said inner wall and by spaced side walls extending between said bottom wall and said inner wall, wherein said bottom wall has therein an opening, and wherein said conduit communicates with said opening.

16. Apparatus as set forth in claim 1 and further comprising an inlet for introducing pellets of material into said inlet end of said chamber, the pellets having an average thickness, wherein said chamber has a top and a bottom, wherein said screw has a direction of rotation, wherein said axis extends horizontally, wherein said recess includes an upstream portion, a downstream portion, and a main portion between said upstream and downstream portions, said upstream portion having a depth which increases in the downstream direction, said main portion having a depth greater than the average thickness of the pellets, said upstream portion and said main portion extending along said bottom of said chamber and along a vertical plane including said axis, said downstream portion extending circumferentially and longitudinally of said chamber in said direction of rotation, and said downstream portion having a depth which decreases in the downstream direction, wherein said recess is defined by a bottom wall spaced from said inner wall and by spaced side walls extending between said bottom wall and said inner wall, wherein said bottom wall has therein an opening having a diameter less than the average thickness of the pellets, and wherein said conduit communicates with said opening.

17. Apparatus as set forth in claim 1 wherein said barrel is heated.

18. Apparatus as set forth in claim 1 wherein said conduit communicates with said recess through a bore in said barrel, said bore having a diameter, and wherein said recess has a length in the direction of said axis, said length being substantially greater than said diameter.

19. Apparatus as set forth in claim 18 wherein said recess has a width substantially greater than said diameter.

20. Apparatus for extruding colored molten material, said apparatus comprising a heated barrel including a generally cylindrical inner wall defining a generally cylindrical chamber having a longitudinal axis, an inlet end adapted to receive uncolored solid material, and an outlet end adapted to discharge colored molten material, said inner wall having therein a recess extending longitudinally of said chamber, a screw which extends along said longitudinal axis and which is rotatably housed in said chamber, a drive mechanism for rotating said screw about said axis, a low-pressure pump having an inlet adapted to communicate with a source of colorant and having an outlet, and a conduit having an upstream end communicating with said pump outlet and having a downstream end communicating directly with said recess so that colorant flowing from said conduit flows directly into said recess prior to flowing from said recess into said chamber.

21. Apparatus as set forth in claim 20 and further comprising an inlet for introducing pellets of material into said inlet end of said chamber, the pellets having an average thickness, wherein said chamber has a top and a bottom, wherein said screw ham a direction of rotation, wherein said axis extends horizontally, wherein said recess includes an upstream portion, a downstream portion, and a main portion between said upstream and downstream portions, said upstream portion having a depth which increases in the downstream direction, said main portion having a depth greater than the average thickness of the pellets, said upstream portion and said main portion extending along said bottom of said chamber and along a vertical plane including said axis, said downstream portion extending circumferentially and longitudinally of said chamber in said direction of rotation, and said downstream portion having a depth which decreases in the downstream direction, wherein said recess is defined by a bottom wall spaced from said inner wall and by spaced side walls extending between said bottom wall and said inner wall, wherein said bottom wall has therein an opening having a diameter less than the average thickness of the pellets, and wherein said conduit communicates with said opening.

22. Apparatus for injection molding colored molten material, said apparatus comprising a heated barrel including a generally cylindrical inner wall defining a generally cylindrical chamber having a longitudinal axis, an inlet end adapted to receive uncolored solid material, and an outlet end adapted to discharge colored molten material, said inner wall having therein a recess extending longitudinally of said chamber, a screw which extends along said longitudinal axis and which is rotatably housed in said chamber, a drive mechanism for rotating said screw about said axis and for reciprocating said screw along said axis, a low-pressure pump having an inlet adapted to communicate with a source of colorant and having an outlet, and a conduit having an upstream end communicating with said pump outlet and having a downstream end communicating directly with said recess so that colorant flowing from said conduit flows directly into said recess prior to flowing from said recess into said chamber.

23. Apparatus as set forth in claim 22 and further comprising an inlet for introducing pellets of material into said inlet end of said chamber, the pellets having an average thickness, wherein said chamber has a top and a bottom, wherein said screw has a direction of rotation, wherein said axis extends horizontally, wherein said recess includes an upstream portion, a downstream portion, and a main portion between said upstream and downstream portions, said upstream portion having a depth which increases in the downstream direction, said main portion having a depth greater than the average thickness of the pellets, said upstream portion and said main portion extending along said bottom of said chamber and along a vertical plane including said axis, said downstream portion extending circumferentially and longitudinally of said chamber in said direction of rotation, and said downstream portion having a depth which decreases in the downstream direction, wherein said recess is defined by a bottom wall spaced from said inner wall and by spaced side walls extending between said bottom wall and said inner wall, wherein said bottom wall has therein an opening having a diameter less than the average thickness of the pellets, and wherein said conduit communicates with said opening.

24. Apparatus comprising a barrel including a generally cylindrical inner wall defining a generally cylindrical chamber having a longitudinal axis, an inlet end, an outlet end, a low-pressure section adjacent said inlet end, and a high-pressure section downstream of said low-pressure section, said inner wall having therein a recess extending longitudinally of said chamber, said recess having an upstream end in said low-pressure section and a downstream end in said high-pressure section, a screw which extends along said longitudinal axis and which is rotatably housed in said chamber, a drive mechanism for rotating said screw about said axis, means for introducing solid material to said inlet end of said chamber so that said screw moves the material through said chamber and toward said outlet end, and means for introducing a liquid additive into said recess in said low-pressure section of said chamber so that additive flowing from said conduit flows directly into said recess prior to flowing from said recess into said chamber and so that the additive moves toward said downstream end and remains substantially in said recess until reaching said downstream end.

25. A method for adding liquid additive to material in an apparatus including a heated barrel with a generally cylindrical inner wall defining a generally cylindrical chamber, the chamber having a longitudinal axis, an inlet end adapted to receive uncolored solid material, and an outlet end adapted to discharge colored molten material, a screw which extends along the longitudinal axis and which is rotatably housed in the chamber, and a drive mechanism for rotating the screw about the axis, said method comprising the steps of providing in the inner wall of the barrel with a recess extending longitudinally of the chamber, and injecting liquid additive directly into said recess so that the additive flows directly into said recess prior to flowing into said chamber.

26. A method as set forth in claim 25 wherein said injecting step includes the step of utilizing a low-pressure pump having an outlet communicating with said recess.

27. A method as set forth in claim 25 wherein said additive is a colorant.

28. Apparatus as set forth in claim 1 wherein said recess has a recess length in the direction of said axis, and wherein chamber has a chamber length in the direction of said axis, said chamber length being substantially greater than said recess length.

29. Apparatus as set forth in claim 1 wherein said chamber includes a feed section which extends from said inlet end of chamber and in which solid material introduced into said inlet end of said chamber remains substantially solid and at a relatively low pressure, and wherein a majority of said recess is located in said feed section.

30. Apparatus as set forth in claim 1 and further comprising a supply of liquid additive, and wherein said conduit has an upstream end communicating with said supply.

31. Apparatus as set forth in claim 20 wherein said recess has a recess length in the direction of said axis, and wherein chamber has a chamber length in the direction of said axis, said chamber length being substantially greater than said recess length.

32. Apparatus as set forth in claim 20 wherein said chamber includes a feed section which extends from said inlet end of chamber and in which solid material introduced into said inlet end of said chamber remains substantially solid and at a relatively low pressure, and wherein a majority of said recess is located in said feed section.

33. Apparatus as set forth in claim 20 and further comprising a supply of liquid colorant, and wherein said conduit has an upstream end communicating with said supply.

34. Apparatus as set forth in claim 22 wherein said recess has a recess length in the direction of said axis, and wherein chamber has a chamber length in the direction of said axis, said chamber length being substantially greater than said recess length.

35. Apparatus as set forth in claim 22 wherein said chamber includes a feed section which extends from said inlet end of chamber and in which solid material introduced into said inlet end of said chamber remains substantially solid and at a relatively low pressure, and wherein a majority of said recess is located in said feed section.

36. Apparatus as set forth in claim 22 and further comprising a supply of liquid colorant, and wherein said conduit has an upstream end communicating with said supply.

37. Apparatus as set forth in claim 24 wherein said recess has a recess length in the direction of said axis, and wherein chamber has a chamber length in the direction of said axis, said chamber length being substantially greater than said recess length.

38. Apparatus as set forth in claim 24 wherein said chamber includes a feed section which extends from said inlet end of chamber and in which solid material introduced into said inlet end of said chamber remains substantially solid and at a relatively low pressure, and wherein a majority of said recess is located in said feed section.

39. Apparatus as set forth in claim 24 and further comprising a supply of liquid additive, and wherein said means for introducing a liquid additive communicates with said supply.

40. Apparatus as set forth in claim 1 wherein said recess has a downstream end and wherein said additive substantially remains in said recess until reaching said downstream end.

41. Apparatus as set forth in claim 20 wherein said recess has a downstream end and wherein said additive substantially remains in said recess until reaching said downstream end.

42. Apparatus as set forth in claim 22 wherein said recess has a downstream end and wherein said additive substantially remains in said recess until reaching said downstream end.

* * * * *